United States Patent [19]

Momose et al.

[11] Patent Number: 4,817,178

[45] Date of Patent: Mar. 28, 1989

[54] LINEAR CURSOR REPRESENTATION METHOD

[75] Inventors: Kaoru Momose, Tokyo; Makoto Kato, Kawasaki; Tetsuo Yokoyama, Tokyo; Toshihiro Furuya, Katsuta, all of Japan

[73] Assignee: Hitachi, Ltd., Tokyo, Japan

[21] Appl. No.: 852,312

[22] Filed: Apr. 15, 1986

[30] Foreign Application Priority Data

Apr. 15, 1985 [JP] Japan .................. 60-78351

[51] Int. Cl.$^4$ .................. G06K 9/00; G06F 3/153
[52] U.S. Cl. .................. 382/46; 340/709; 340/727; 340/734; 382/28
[58] Field of Search .................. 382/28, 46; 356/384; 340/727, 734, 709

[56] References Cited

U.S. PATENT DOCUMENTS

| | | | |
|---|---|---|---|
| 4,115,803 | 9/1978 | Morton | 382/28 |
| 4,225,929 | 9/1980 | Ikeda | 340/727 |
| 4,295,135 | 10/1981 | Sukonick | 340/734 |
| 4,302,755 | 11/1981 | Pisani et al. | 340/734 |
| 4,317,114 | 2/1982 | Walker | 340/734 |
| 4,415,889 | 11/1983 | Davis | 340/727 |
| 4,481,509 | 11/1984 | Sasaki et al. | 340/727 |
| 4,611,232 | 9/1986 | Searby | 340/727 |
| 4,624,537 | 11/1986 | Hanssen et al. | 340/709 |

OTHER PUBLICATIONS

Dorst et al, "Spirograph Theory: A Framework for Calculations on Digitized Straight Lines", *Trans on Pattern Analysis & Machine Intelligence*, vol. PAMI-6, No. 5, Sep. 1984, pp. 632–638.

*Primary Examiner*—Leo H. Boudreau
*Attorney, Agent, or Firm*—Antonelli, Terry & Wands

[57] ABSTRACT

To measure a line width of a linear portion of a digital image maintaining a precision finer than a picture element, a digital linear cursor pattern represented by digital picture elements is generated, the pattern is inclined with respect to the horizontal direction by an angle which maximizes the measuring precision, and the pattern is fitted to a linear portion to be measured, to thereby measure the width of a line.

4 Claims, 6 Drawing Sheets

LINEAR CURSOR REPRESENTATION METHOD

BACKGROUND OF THE INVENTION

The present invention relates to a method of representing a digital cursor, and more particularly to a method of representing a cursor for measuring a linear position while maintaining maximum precision.

Accompanying the recent progress in LSI technology, attempts have been made to recognize a variety of patterns and to detect positions in a digital image. Particularly, it has been attempted to input a digital image in on-line systems using scanning electron microscopes, in order to measure line widths on the surface of a semiconductor.

At present, the lengths are measured manually. In this case, a pattern such as a straight line is set to be horizontal or vertical with respect to the screen. When the line is to be tilted with respect to the screen, this is accomplished by turning the screen to set the line to a horizontal or vertical orientation with respect to the screen. The position is measured by a linear cursor in the horizontal or in the vertical direction.

Since a digital cursor is employed, measurement by a linear cursor in the horizontal or in the vertical direction is accurate to one picture element at the greatest. Therefore, patterns smaller than a picture element cannot be measured.

SUMMARY OF THE INVENTION

The object of the present invention is to provide a linear cursor representation method for a digital image, which is capable of recognizing the position of a linear portion in a digital image input by a scanning electron microscope maintaining a precision of finer than a picture element.

In order to achieve the above-mentioned object according to the present invention, the linear cursor is represented by digital picture elements and both the cursor and the digital image are rotated on the display screen by a predetermined angle based upon the fact that, in a pattern representing the linear cursor, a movement of a cursor over a distance smaller than a picture element can be represented if the straight line is inclined to some extent to achieve a maximum resolving power.

DETAILED DESCRIPTION OF THE PREFERRED EMBODIMENTS

For easy comprehension, first, the invention will be described with reference to a simple example.

Figure 1A:
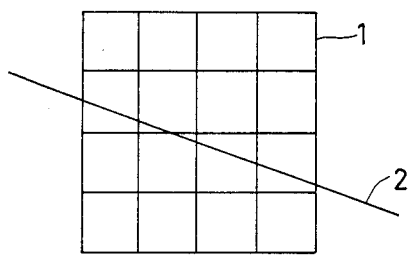
FIGS. 1(a-c), 2(a-e) and 3(a-h) are diagrams showing straight lines that are digitally represented.
Figure 1B:
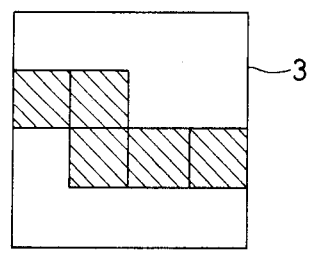

With reference to FIG. 1(a), an ideal straight line 2 is imagined that passes through a 4×4 square region 1 in a digital image. Here, the line has no thickness. As shown in FIG. 1(b), the square picture elements have a level 1 (hatched areas) if the straight line enters therein even a little, and have a level 0 (blank areas) if the straight line does not enter therein. If the line exists on a boundary, the line is considered to pertain to either one of them. Thus, a digital line can be represented which is closest to an ideal straight line.

Figure 1C:
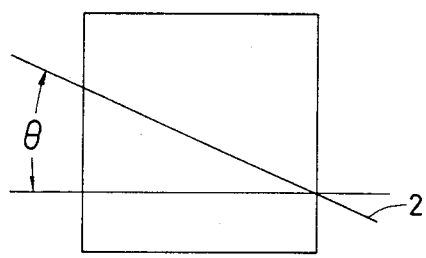
Figure 2A:
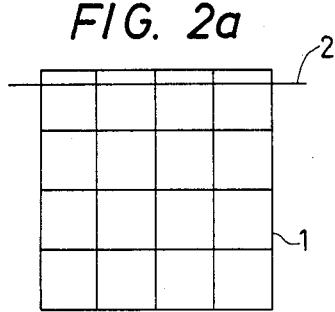
Figure 2B:
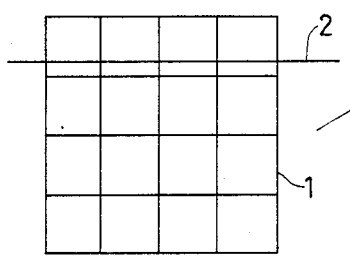
Figure 2C:
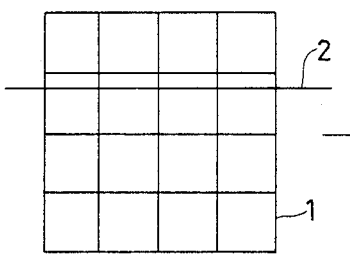
Figure 2D:
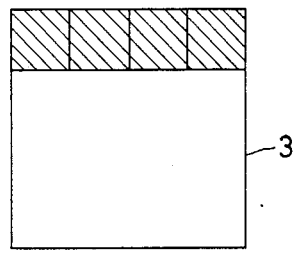
Figure 2E:
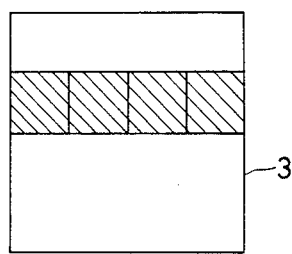
Figure 3A:
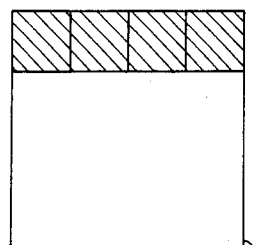
Figure 3A:
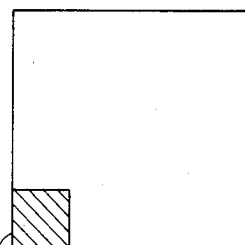
Figure 3A:
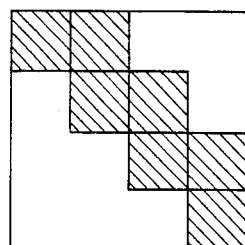
Figure 3A:
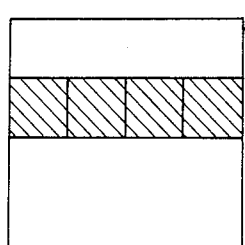
Figure 3B:
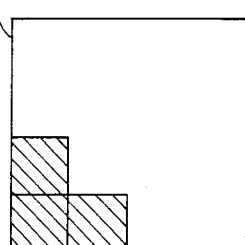
Figure 3B:
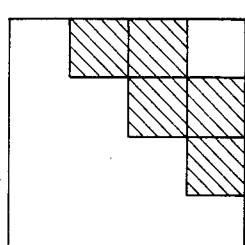
Figure 3B:
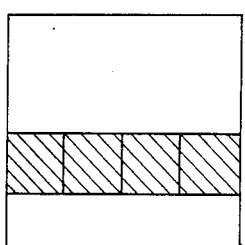
Figure 3B:
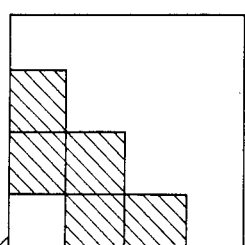
Figure 3B:
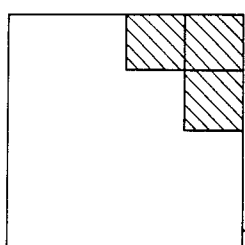
Figure 3B:
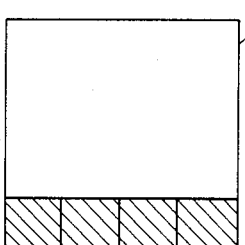
Figure 3B:
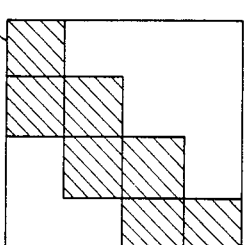
Figure 3B:
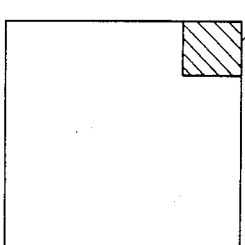
Figure 4:
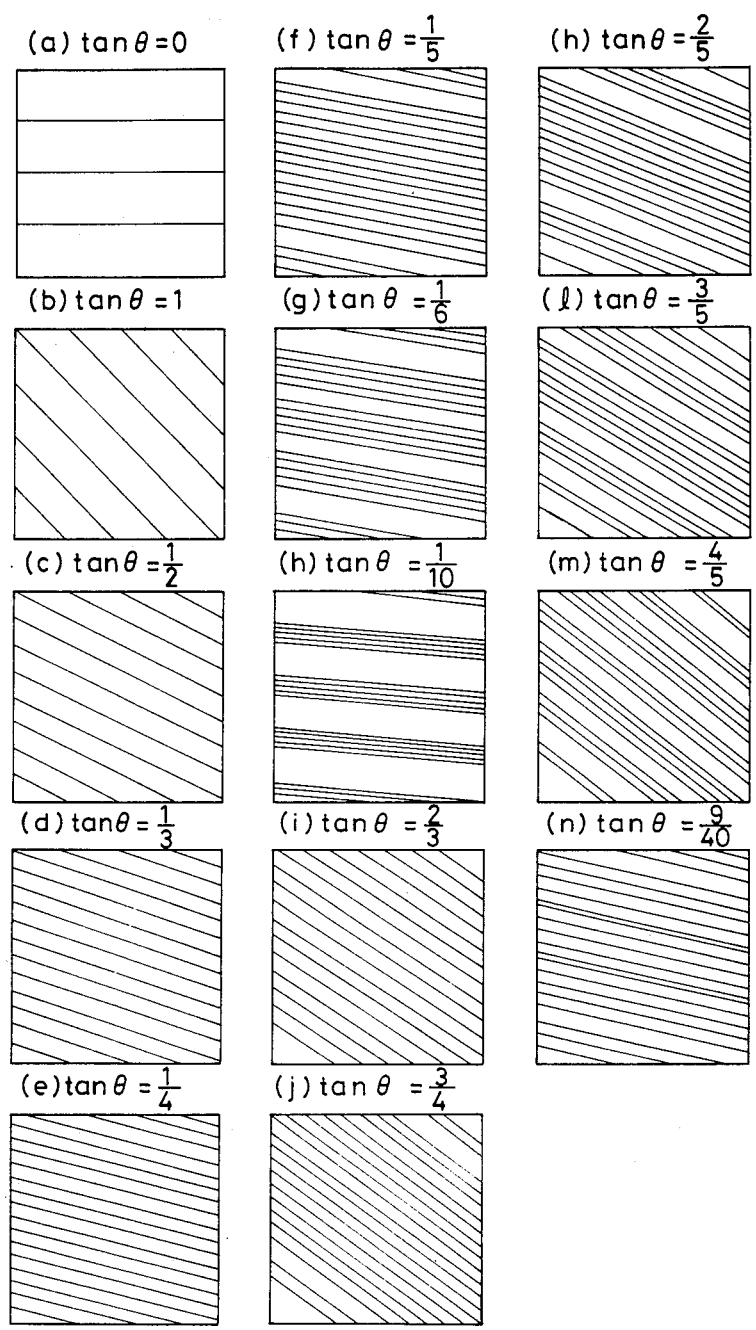
FIG. 4 is a diagram showing straight lines that can be represented by digital picture elements by tilting the straight lines.
Figure 5:
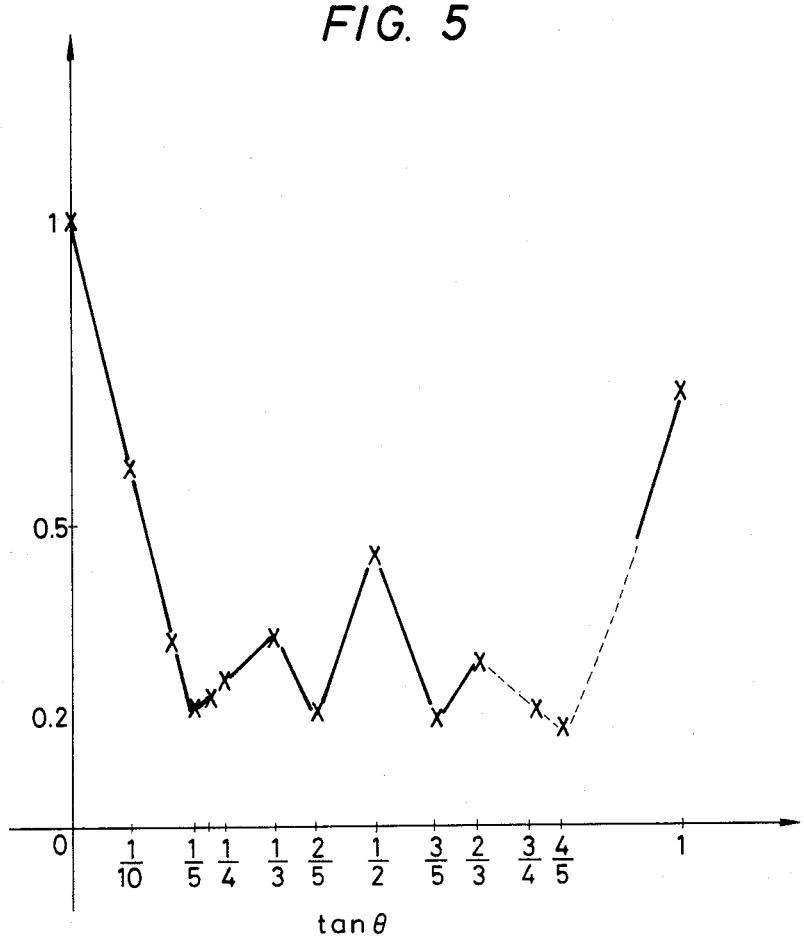
FIG. 5 is a graph showing effective resolving distances depending upon the inclination of a straight line.

In this case, the angle $\theta$ of the straight line 2 with respect to the screen is represented as shown in FIG. 1(c). FIGS. 2(a), 2(b) and 2(c) show the cases where tan $\theta=0$, i.e., $\theta=0$. The digital lines corresponding to FIGS. 2(a) and 2(b) are shown in FIG. 2(d), and the digital line corresponding to FIG. 2(c) is shown in FIG. 2(e). In the case where tan $\theta=0$, therefore, there are only four representations as shown in FIG. 3(a) with the arrangement of 4×4 picture elements. Therefore, the line of tan $\theta=0$ that passes through the region expressed by 4×4 digital images, has arbitrariness equal to the width of a picture element. The width of the picture element is defined as an effective resolving distance. FIG. 3(b) shows the digital expression of a line when tan $\theta=1$, i.e., when $\theta=45°$. These images correspond to those positions in which the straight line exists within a trapezoid or a triangle of FIG. 4(b). The effective resolving distance is $\sqrt{}/2$ picture elements. FIGS. 4(c) to 4(n) show the result when the same procedure is carried out under the conditions of other angles $\theta$. In expressing the positions of lines, the gap betwen the lines should be narrow and uniform. When the gaps among the lines are not uniform as shown in FIG. 4(h), the effective resolving distance increases inevitably. FIG. 5 shows a relationship between various angles tan $\theta$ and the effective resolving distance that is defined to be a scale of line gap which can be effectively discriminated in the 4×4 rectangular regions.

The above results change with the change in the size of the rectangular regions, i.e., with the number n of pixels which make up the x and y directions of the region. With the size of n x n, for instance, when q/p (p and q are positive integers which are prime to each other with p=n and n 30 1) is a rational number, the inclination of the cursor represented by tangent $\theta$ ($\theta$ is the angle of the cursor versus the x axis) gives a value closest to q/p. An angle can then be found which gives the highest precision and, theoretically, a resolving power which is as high as about 1/n the picture element gap can be obtained.

As described above, measurement can be taken maintaining a precision finer than a picture element by finding an optimum angle for measurement depending upon the length of the digital cursor for measurement, and by deliberately tilting the displayed image and the linear cursor to make the measurement.

A concrete embodiment of the present invention will now be described in conjunction with FIGS. 6, 7 and 8.

This embodiment measures the width between the edges linear portion of a semiconductor relying upon a surface image of the semiconductor taken through a scanning electron microscope.

Figure 6:
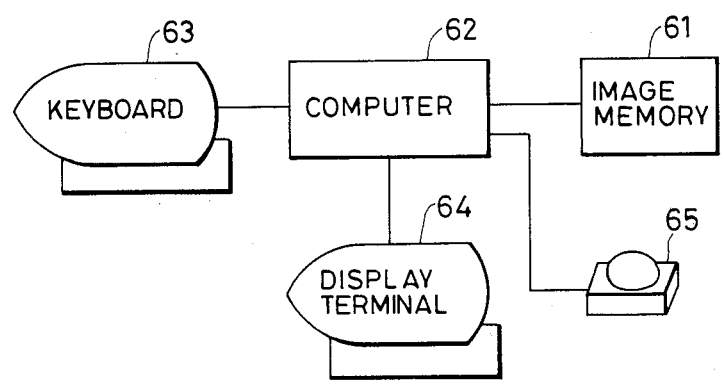
FIG. 6 is a block diagram of a processing apparatus to which the present invention is adapted.

FIG. 6 is a system diagram of an image processing apparatus to which the present invention is adapted.

An image to be measured is stored in an image memory 61. A given image region specified by an operator through a keyboard 63 is displayed on a display terminal 64 under the control of a computer 62. A cursor displayed on the display terminal 64 is controlled and measured by a track ball 65.

The procedure for measuring the edge position according to the present invention will now be described in conjunction with a flow chart of FIG. 7.

Figure 7:
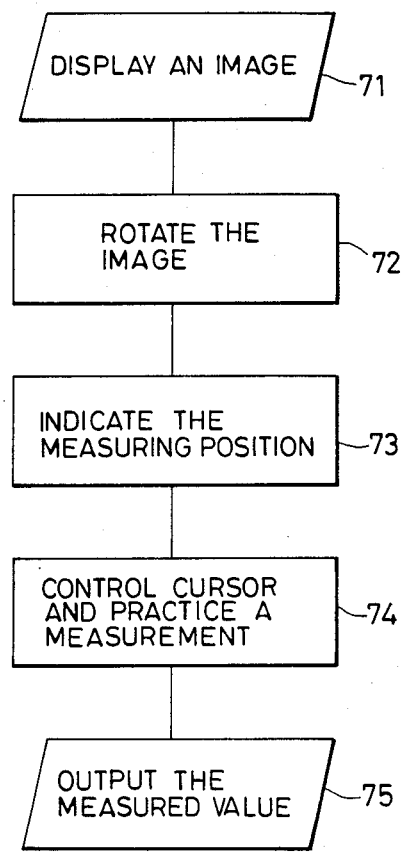
FIG. 7 is a flow chart showing the procedure for processing the digital linear cursor representation according to the present invention.
Figure 8:
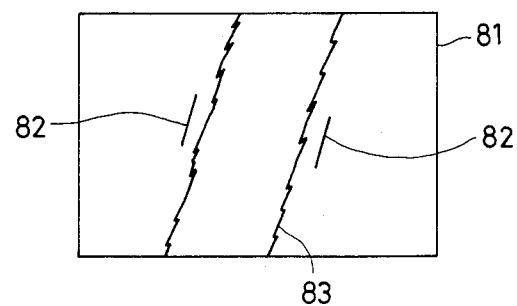
FIG. 8 is a diagram showing an image and cursors displayed on a display terminal.

At a step 71 of FIG. 7, an image to be measured is displayed on the display terminal 64. A step 72 turns the image so that the image to be measured is tilted by a given angle determined on the basis of the selected value n to achieve the maximum resolving power. At a step 73, a portion to be measured in the image is roughly specified by the track ball 65. At a step 74 in which the width between edges is to be measured, two digital cursors 82 of the invention are displayed on a displayed image 81 as shown in FIG. 8, the position and inclination of the cursors 82 are adjusted by using the track ball 65, and the cursors 82 are fitted to a measuring portion 83 in the displayed image 81, in order to measure the line width under the best-fitted condition.

At this moment, the width between edges is calculated from the central positions of two cursor patterns which can be determined from the movement of the track ball. The movement of the track ball in the horizontal direction is to determine the position of the line in the X-direction, and the movement of the track ball in the vertical direction is to determine the inclination of the line.

A step 75 produces a measured position.

According to this embodiment as described above, a person who takes a measurement changes the position and/or orientation of the cursor freely while looking at the image, and measures the edge position relying upon a cursor which is closest to the shape of the edge being measured.

According to the present invention, the position of a line in a digital image can be measured while maintaining a precision which is finer than a picture element.

What is claimed is:

1. A method of measuring with high precision a linear portion of a digital image displayed on a display screen using at least one linear cursor, comprising the steps of:
    rotating said digital image on said display screen to a selected angle which provides a maximum measuring precision;
    generating on said digital image on said display screen at least one digital cursor pattern using digital picture elements; and
    positioning said digital cursor pattern at said selected angle by fitting it to said linear portion to be measured on said rotated digital image to effect a measurement thereof.

2. The method of claim 1, wherein said positioning of said digital cursor pattern includes rotating said cursor pattern to said selected angle, moving said rotated cursor pattern between boundary points of the linear postion to be measured, and determining the dimension of said linear portion on the basis of the movement of said rotated cursor pattern.

3. The method of claim 1, wherein said cursor pattern is generated by illuminating all picture element intersected by a true straight line at the position on said display screen where said cursor is to appear.

4. The method of claim 1, wherein said generating step includes generating a pair of digital cursor patterns, and said positioning step includes rotating said cursor patterns to said selected angle, moving said rotated cursor patterns to respective boundary points of said linear portion to be measured, and determining the dimension of said linear portion of the basis of the relative difference in position of said cursor patterns.

* * * * *